3,590,061
BIS(TRIHYDROCARBYLTIN)PHTHALATES
Pasquale P. Minieri, Woodside, N.Y., assignor to
Tenneco Chemicals, Inc.
No Drawing. Filed Feb. 24, 1969, Ser. No. 801,850
Int. Cl. C07f 7/22; C08f 45/62; A01n 9/24
U.S. Cl. 260—429.7     2 Claims

ABSTRACT OF THE DISCLOSURE

Organotin compounds that have the structural formula

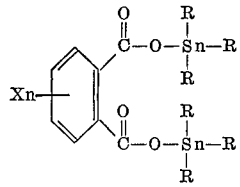

wherein each R represents phenyl or an alkyl group having from 4 to 8 carbon atoms, X represents an alkyl group having from 1 to 4 carbon atoms, chlorine, phenyl, or nitro, and $n$ represents an integer in the range of 1 to 4, effectively control the growth of undesirable organisms. Illustrative of these compounds is bis(tri-n-butyltin)3,4-dimethyl-6-isobutylphthalate.

---

This invention relates to novel organotin compounds and to their use in the control of various plant and animal pests. More particularly, it relates to the use of compositions containing these organotin compounds to control the growth of undesirable fungi and insects.

In accordance with this invention, it has been found that certain substituted organotin phthalates have unusual and valuable activity as fungicides and as insecticides. These compounds may be represented by the structural formula

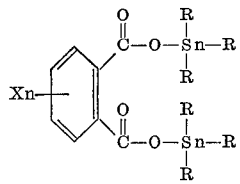

wherein each R represents phenyl or an alkyl group having from 4 to 8 carbon atoms, X represents an alkyl group having from 1 to 4 carbon atoms, chlorine, phenyl, or nitro, and $n$ represents an integer in the range of 1 to 4. Illustrative of these compounds are the following:

bis(tri-n-butyltin)3,4,5-trimethylphthalate,
bis(tri-n-hexyltin)3,5,6-trimethylphthalate,
bis(tri-2-ethylhexyltin)3,4,5,6-tetrachlorophthalate,
bis(tri-tert. butylin(3,4,5,6-tetrachlorophthalate,
bis(tri-n-octyltin)3,4,5,6-tetraphenylphthalate,
bis(triphenyltin)3-nitrophthalate,
and the like.

The organotin compounds of this invention may be prepared by any suitable and convenient procedure. For example, they may be prepared by the reaction of the appropriate substituted phthalic anhydride with a trialkyl or triaryl tin oxide. Suitable substituted phthalic anhydrides may be obtained, for example, by the aromatization of products of the condensation of maleic anhydride with dienes, such as 1,3-hexadiene, 2,4-hexadiene, 3-methyl-2,4-hexadiene, 2,4-dimethyl-1,3-pentadiene, dimethyl butadienes, isoprene, 1,1,3 - trimethylbutadiene, 1,1,4 - trimethylbutadiene, 1 - phenyl-4-methylbutadiene, allo-ocimene, 5-methyl-4-isopropyl-1,3-hexadiene, and the like, by treatment first with palladium and then with an alkaline or acidic aqueous solution.

The organotin compounds of this invention may be applied to fungi, insects, and other pests to control or inhibit their growth. They are of particular value in the control of the growth of fungi.

In a preferred embodiment of the invention, the substituted organotin phthalates are used to impart fungal resistance to a wide variety of surface-coating compositions including both organic solvent-based and water-based coating systems. They are particularly valuable as fungicides in coatings that contain polyvinyl acetate as their resinous binder.

The oleoresinous materials that may be used as binders in these water-based and solvent-based surface-coating compositions include drying oils, such as linseed oil, tung oil, soybean oil, dehydrated castor oil, safflower oil, or fish oil; bodied drying oils; blends of drying oils or bodied drying oils with a resin component such as limed rosin, an ester gum, or phenolic resin; oleoresinous varnishes formed by heating one of the aforementioned resins with one or more drying oils or bodied drying oils; and alkyd resins, which are resinous products resulting from the reaction of a polyhydric alcohol, such as pentaerythritol or glycerol, with a dicarboxylic acid, such as phthalic anhydride, and fatty acids. Alternatively, the water-based composition may contain as binder a synthetic linear addition polymer. The aqueous dispersions of synthetic linear addition polymers are ordinarily prepared by the emulsion polymerization of ethylenically-unsaturated compounds, especially those of monoethylenically-unsaturated character, although butadiene, chlorobutadiene, and isoprene may be used to some extent. Illustrative of the synthetic linear addition polymers that can be used as the resinous binder in the aqueous dispersions are polyvinyl acetate; polyvinyl butyrate; polyvinyl chloride; copolymers of vinyl acetate with acrylonitrile; copolymers of vinyl chloride with vinylidene chloride; polyethylene; polyisobutylene; polystyrene; copolymers of styrene with butadiene; copolymers of acrylonitrile with butadiene; copolymers of methacrylic acid esters of alcohols having 1 to 8 carbon atoms with vinyl acetate, vinyl chloride, acrylonitrile, or styrene; copolymers of acrylic acid esters of alcohols having 1 to 8 carbon atoms with vinyl acetate, vinyl chloride, acrylonitrile, or styrene; and copolymers of styrene with maleic anhydride.

Only a small concentration of the substituted organotin phthalate need be present in the surface-coating compositions. As little as 0.10 percent of the fungicide, based on the weight of the composition, will bring about an appreciable improvement in the resistance of the composition to attack by fungi. Approximately 5.0% or more of the fungicide, based on the weight of the composition, can be used, but these larger amounts generally do not provide further improvement in the properties of the surface-coating compositions and for this reason are not ordinarily used. While the amount of the fungicide that will provide optimum protection for the surface-coating compositions depends upon such factors as the choice of fungicide, the choice of resinous binder and other components of the composition, the amount of each that is employed and the application for which the coating composition is intended, in most cases about 0.25 percent to 2.0 percent of the fungicide, based on the weight of the surface-coating composition, is used.

In addition to the resinous binder and the fungicide, the surface-coating compositions of this invention may contain various auxiliary materials, such as pigments, extenders, solvents, dyes, defoaming agents, driers, emulsifying agents, dispersing agents, plasticizers, and the like in the amounts ordinarily used for these purposes.

The substituted organotin phthalate that is used as the fungicide may be incorporated into the surface-coating composition by any convenient procedure. For example, it can be combined with pigments and various other components to form a pigment phase that is then mixed with the resinous binder and water or an organic solvent to form the surface-coating composition. Alternatively, it can be added to a composition that contains the resinous binder, pigment, and water or organic solvent. The fungicidal compound can be added as such to the other components of the surface-coating composition, or it can be added as a solution of the organotin compound in an alcohol, ether, ketone or other solvent.

In other preferred embodiments of the invention, the compounds are applied to plant and animal pests to control or inhibit their growth. The locus in which control is to be effected may, if desired, be treated with the compounds of this invention, or the compounds may be applied directly to the organisms whose growth is to be controlled.

While the pesticidal compounds of this invention may be used as such in the control of the growth of undesirable organisms, they are usually and preferably used in combination with an inert carrier which facilitates the dispensing of dosage quantities of the compounds and assists in their absorption by the organism. The pesticidal compounds may be mixed with or deposited upon inert particulate solids, such as fuller's earth, talc, diatomaceous earth, hydrated calcium silicate, kaolin, and the like to form dry particulate compositions. Such compositions may, if desired, be dispersed in water with or without the aid of surface-active agents. The compounds are preferably dispensed in the form of solutions or dispersions in inert organic solvents, water, or mixtures of inert organic solvents and water, or as oil-in-water emulsions. The concentration of the active materials in the compositions may vary within wide limits and depends upon a number of factors, the most important of which are the type or types of undesirable organisms being treated and the amount of the composition to be applied. If desired, mixtures of two or more of the novel compounds as well as other pesticidal compounds may be present in the compositions.

The invention is further illustrated by the examples that follow.

EXAMPLE 1

(A) To 476 grams (3.5 moles) of freshly-distilled allo-ocimene was added a solution of 245 grams (2.5 moles) of maleic anhydride in 720 grams (8.17 moles) of ethyl acetate at such a rate that the temperature rose to 88°–90° C. and remained at that temperature throughout the addition. The reaction mixture was heated with stirring at 88°–90° C. for 5 hours and then heated under vacuum to remove the ethyl acetate. The residue was distilled under reduced pressure to remove unreacted allo-ocimene from the product. There was obtained about 450 grams of 3,4-dimethyl-6-isobutenyltetrahydrophthalic anhydride.

(B) A mixture of 330 grams (1.42 moles) of 3,4-dimethyl-6-isobutenyl-tetrahydrophthalic anhydride and 20 grams of 5% palladium on carbon was stirred for 6 hours at 260°–280° C. and then cooled to room temperature. After it had been allowed to stand overnight, the reaction mixture was treated with 820 ml. of a 15% aqueous sodium hydroxide solution, heated at 90°–100° C. for 1 hour, diluted with 1700 ml. of water, and filtered. The filtrate was acidified to pH 5 with hydrochloric acid. The crude product that precipitated was collected and recrystallized from ethanol. There was obtained 102.8 grams of 3,4-dimethyl-6-isobutylphthalic anhydride, which melted at 89°–90° C.

(C) A mixture of 11.67 grams (0.05 mole) of 3,4-dimethyl-6-isobutylphthalic anhydride, 31.3 grams (0.05 mole) of tri-n-butyltin oxide, and 150 ml. of toluene was heated at its reflux temperature for three hours and then cooled to room temperature. The reaction mixture was heated at 60° C. under vacuum to remove the toluene. There was obtained 43.6 grams of bis(tri-n-butyltin)3,4-dimethyl-6-isobutylphthalate, a clear light-yellow liquid that contained 55.66 percent C, 0.94 percent H, and 29.73 percent Sn (Calculated, 55.0% C, 0.83% H, and 28.7% Sn).

EXAMPLE 2

A polyvinyl acetate emulsion paint was prepared by mixing together the following materials:

| | Parts by weight |
|---|---|
| Water | 280 |
| Potassium pyrophosphate | 3 |
| Calcium metasilicate | 135 |
| Titanium dioxide (rutile) | 220 |
| Aqueous solution of methylcellulose (2%) | 200 |
| Diethyl ether of diethylene glycol | 37 |
| Aqueous solution containing 55% by weight of polyvinyl acetate | 350 |

To samples of the polyvinyl acetate emulsion paint were added 2% by weight of the product of Example 1 or a commercial fungicide. Pieces of drawdown paper were dipped into each of the treated paints, dried for 24 hours, and again dipped into the paint. After a 24 hour drying period, one of the samples coated with each of the treated paints was leached for 24 hours in accordance with Method 5831, CCC–T–1916. The coated paper samples were cut into 1¼″ squares. Each of the coated paper squares thus obtained was placed on a plate of malt and mycophil agar, which had previously been inoculated with 1 ml. of a suspension of the test organism. The plates, prepared in triplicate, were incubated at 28° C. and observed weekly. The growth was estimated according to the following key, and the results of the replicate plates were averaged:

ZO=Zone of inhibition in mm.
O=No zone of inhibition.
1–10=Increasing amounts of growth.

The results obtained are summarized in Table I.

TABLE I

| | Fungicide | | |
|---|---|---|---|
| | Product of Example 1 | Phenylmercuric acetate | None |
| Effect on color of: | | | |
| Liquid paint | None | None | |
| Paint film | None | None | |
| pH | 7.5 | 6.9 | 7.1 |
| Sulfide staining | None | Severe | None |
| *Pullularia pullulans:* | | | |
| Unleached: | | | |
| 1 week | ZO-2 | O | 10 |
| 2 weeks | ZO-2 | O | 10 |
| 4 weeks | ZO-2 | O | 10 |
| Leached: | | | |
| 1 week | ZO-2 | O | 10 |
| 2 weeks | 1 | O | 10 |
| 4 weeks | 1 | O | 10 |
| *Aspergillus niger:* | | | |
| Unleached: | | | |
| 1 week | ZO-4 | ZO-11 | 10 |
| 2 weeks | ZO-4 | ZO-11 | 10 |
| 4 weeks | ZO-3 | ZO-10 | 10 |
| Leached: | | | |
| 1 week | O | ZO-6 | 10 |
| 2 weeks | O | ZO-6 | 10 |
| 4 weeks | O | O | 10 |

EXAMPLE 3

A series of tests was carried out in which aqueous solutions of the product of Example 1 were applied to plants infested with various insects. In no case was there appreciable injury to the plants. The results obtained are summarized in Table II.

TABLE II

| Rate of application (p.p.m.) | Percent control of insect | | | | |
|---|---|---|---|---|---|
| | Mexican bean beetles | Southern army worms | Aphids | 2-spotted spider mites | House flies |
| 1,000 | 80 | 100 | 100 | 100 | 100 |
| 250 | 50 | 100 | 100 | 95 | 100 |
| 50 | 20 | 0 | 50 | 37 | 45 |

EXAMPLE 4

Separate lots of sterilized soil were inoculated with plant pathogens. The inoculated soil was placed in 4-ounce containers, and the soil in each container was drenched with an aqueous solution of the product of Example 1. After incubation for 2 days at 70° F., the amount of mycelial growth on the surface of the soil was noted. The results obtained are summarized in Table III.

TABLE III

| Rate of application (lbs./acre) | Sclerotium rolfsii | Pythium sp. | Rhizoctonia solani | Fusarium oxysporum |
|---|---|---|---|---|
| 300 | No growth | No growth | No growth | No growth. |
| 150 | Few colonies | Few colonies | Few colonies | Few colonies. |
| 75 | Surface one-fourth covered. | Surface one-fourth covered. | Surface one-half covered. | Surface one-fourth covered. |

The terms and expressions that have been used are used as terms of description and not of limitation. There is no intention in the use of such terms and expressions of excluding any equivalents of the features shown and described or portions thereof. It is recognized that various modifications are possible within the scope of the invention claimed.

What is claimed is:

1. A compound having the structural formula

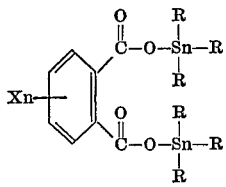

wherein each R represents phenyl or an alkyl group having from 4 to 8 carbon atoms, X represents an alkyl group having from 1 to 4 carbon atoms, chlorine, phenyl, or nitro, and n represents an integer in the range of 1 to 4.

2. A compound as set forth in claim 1 that has the structural formula

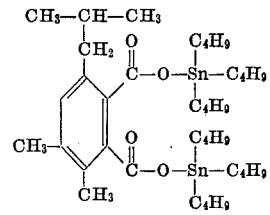

References Cited

UNITED STATES PATENTS

| | | | |
|---|---|---|---|
| 2,977,379 | 3/1961 | Dorfelt et al. | 260—429.7 |
| 3,196,129 | 7/1965 | Hechenbleikner et al. | 260—429.7 |
| 3,382,264 | 5/1968 | Leebrick | 260—429.7 |
| 3,201,432 | 8/1965 | Leebrick | 260—429.7 |
| 3,454,611 | 7/1969 | Minieri | 260—429.7 |
| 3,479,380 | 11/1969 | Minieri | 260—429.7 |

JAMES E. POER, Primary Examiner

W. F. W. BELLAMY, Assistant Examiner

U.S. Cl. X.R.

260—45.75; 424—288